Nov. 24, 1970 M. A. P. E. P. DIEDERICH 3,543,170

DIFFERENTIATORS

Filed July 29, 1968 2 Sheets-Sheet 1

United States Patent Office 3,543,170
Patented Nov. 24, 1970

3,543,170
DIFFERENTIATORS

Marie Alphonse Paul Eugene Pierre Diederich, London, England, assignor to Decca Limited, London, England, a British company Filed July 29, 1968, Ser. No. 748,441
Claims priority, application Great Britain, Aug. 29, 1967, 39,514/67
Int. Cl. G06g *7/18;* H03k *5/00*
U.S. Cl. 328—164 2 Claims

ABSTRACT OF THE DISCLOSURE

A digital differentiator in which the change in state of an input signal is detected by a comparator responding to disparity between that state and the state of a bistable device. The bistable device is switched to correspond to the state of the input signal if one of a train of high frequency clock pulses from a source is contemporary with an output signal, from the comparator, denoting the said disparity. The bistable device and a buffer memory may comprise JK bistable circuits which in a preferred arrangement form a shift register.

This invention relates to digital differentiators and is particularly directed to devices which are adapted to produce an output signal each time an amplitude varying input signal (which may be a digital signal) enters one of two discrete states. For example, one state may be defined as when the amplitude of the input signal is below one predetermined value and the other state may be defined as when the amplitude of the input signal is above the or another predetermined value. However, the invention is also applicable to situations where an input signal may have, for example, one of two alternative frequencies.

The invention is also concerned with the convenience of operation of data processing or computing devices. When a data processing or computing device has to detect and act upon changes in the state of a varying input signal it is usually desirable to detect and optionally act upon changes in state of the input signal synchronously with the working of the computer or data processing device. Since such devices are commonly controlled by clock pulses, which are short, accurately timed pulses occurring at regular intervals, it is desirable that the changes in state of the input signal should appear to occur synchronously with the next clock pulse succeeding the actual change in state of the input signal; likewise, the signal which indicates a change in the state of the input signal should preferably only last for one "bit time" (that is to say the interval between two successive clock pulses).

According to the invention, a differentiator for producing an output signal when an input signal, which is subject to variation between two states, changes state, comprises a bistable device of which the two stable states each correspond to a respective state of the input signal, a comparator responsive to the state of the input signal and to the state of the bistable device so as to produce an output signal only when the state of input signal and the state of the bistable device do not correspond and a source of clock pulses of which the repetition frequency is higher than the frequency at which the input signal varies between the said two states, the bistable device being arranged to be changed in state only if the output signal of the comparator is contemporary with a clock pulse.

With the present invention, a bistable device has two states which are assigned each to correspond with a state of the input signal. It will be seen that when the state of the incoming signal corresponds to the setting of the bistable device there is no output signal from the comparator. If the state of the input signal changes the comparator will produce an output signal, that is to say, a signal denoting that the state of the bistable device is that previously assigned to the particular state of the input signal.

However, the bistable device is changed in state only if an output from the comparator is contemporary with a clock pulse. For example, there may be provided an AND circuit (or "gate") which receives the output signal of the comparator and the clock pulses at separate inputs, the bistable device being arranged to be changed in state when a signal is present at each input of the AND circuit.

When the bistable circuit is changed in state by the AND circuit, the comparator's output ceases.

With the relatively simple arrangement just described, the "trailing edge" of the output signal from the comparator is synchronous with the next succeeding clock pulse after the change in state of the input signal has occurred. However, the "leading edge" of the output signal from the comparator is asynchronous with a clock pulse. For some purposes this may not matter but it is convenient to provide a further bistable device or "memory" which varies in state in accord with the state of the input signal, the comparator being responsive to the state of the further bistable device for the purpose of detecting the state of the input signal; conveniently means are provided to inhibit the variation in state of the further bistable device except on receipt of a clock pulse. With this arrangement, if the state of the input signal and the state of the further bistable device do not correspond, no action is taken until a clock pulse occurs. When this happens, the state of the further bistable device will change and the comparator will detect the inequality between states of the first and further bistable devices and produce an output signal. However, the first bistable device will now be changed in state; the comparator will now detect equality of states and its output signal will immediately assume its original level. With this construction, any output signal from the comparator only lasts a short time which does not start before the occurrence of a clock pulse and will normally end shortly afterwards depending on the switching times of the various active components employed.

It will be observed that although the output from the comparator may actually be used to change the state of the first bistable device it is not necessary that this be so. For example, it is only necessary that the condition of some logic circuit, whose condition indicates the output from the comparator, be sensed and, if in a condition which indicates that an output signal from the comparator is being produced, provides the necessary command to the first bistable device to change its state, provided of course that a clock pulse is present at the same time.

This aspect of the invention may be better appreciated if a preferred form of it is considered. Conveniently the first and further bistable devices each comprise a JK bistable circuit, arranged so that the state of the said first bistable device is controlled by the other. With this form of the invention, as the state of the input signal changes, the JK bistable circuits are temporarily in different states (whether or not both bistable circuits are inhibited from changing state except when a clock pulse occurs). The comparator senses this lack of correspondence between states to produce the required output signal. However, contemporary with the production of the output signal the first bistable device (JK bistable circuit) is changed in state (a clock pulse being present) by the further JK bistable circuit.

Using this form of the invention, the comparator may comprise two AND circuits, the inputs of one AND circuit being coupled to the direct output of one JK bistable circuit and the inverse output of the other JK bistable circuit and the inputs of the other AND circuit being coupled to the inverse output of the one JK bistable circuit, and the direct output of the other bistable circuit whereby an output from either AND circuit denotes a change in state of the input signal.

The function of the comparator according to this aspect of the invention is essentially the detection of the shifting of a "bit" of binary information from one bistable circuit to the other, in the manner of a shift register. The invention may therefore be embodied in part by a two stage shift register; it is apparent that the stages of the shift register need not be constituted by JK bistable circuits. It would be more convenient to use the shift register with an input signal that is digital in form.

According to this aspect of the invention therefore, a differentiator for an input digital signal comprises a two-stage shift register of which the first stage is adapted to be changed in state by changes in state of the input signal, a source of clock pulses of which the repetition frequency is higher than the frequency at which the input signal varies between states, the shift register being arranged to shift information between stages only when a clock pulse occurs, and means adapted to produce an output signal when information is shifted from the first stage to the second.

In the following, reference will be made to the accompanying drawings in which.

Figure 1:
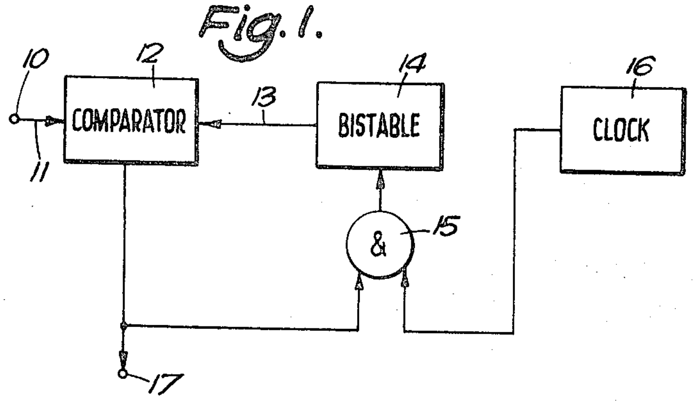
FIG. 1 is a schematic representation of one embodiment of the invention.

Referring firstly to FIG. 1 and FIGS. 4*a* to 4*e*, a signal whose amplitude varies between two states, defined respectively as the "0" and "1" states, is applied to an input terminal 10 and thence to one input 11 of a comparator 12. It will be seen that there is a "no-man's land" between the upper limit of the "0" state and the lower limit of the "1" state and as will be shortly apparent, the apparatus of the drawings only detects the entry into a state. This arises because detection of both entry and departure would require a three state memory whose third state corresponds to the "no-man's land." This problem does not of course arise if the "no-man's land" (or "dead band") does not exist between the states. To the other input 13 of the comparator 12 is coupled one output of a bistable 14 which according to the state of the bistable is at a level corresponding to either the "0" state or "1" state. The comparator device accordingly will produce a non-zero output only if its inputs do not correspond and will produce zero output if the bistable output and the state of the input signal correspond. For example, an input circuit coupled to the input 11 may provide a predetermined positive signal when the input signal is at "1" and a zero signal if the input signal is at "0" and the bistable output may be arranged to yield said predetermined output or zero depending on whether its state is "1" or "0." The comparator may then comprise a difference amplifier. Where there is a dead band between states the aforementioned input circuit could be a dead band amplifier; if there is no dead band it could be a Schmitt trigger. The bistable 14 is arranged to be changed in state each time a signal is received from the output of an AND gate 15 one of whose inputs is connected to a digital clock 16 producing clock pulses C1, C2 etc. at a clock frequency relatively higher than the frequency at which the input signal varies between its two defined states. The other input of the AND gate 15 is connected to the output 17 of the comparator so that the AND gate

15 produces an output only if an output from the comparator and a clock pulse are contemporary.

It will be appreciated that for the purposes of comparison by the comparator it is convenient that, for example, corresponding states of the input signal and the bistable circuit should be associated with equal voltages of like polarity. However, this is by no means essential to the present invention since it is readily possible to alter the assignment of the states by suitable inverting circuits and it is also possible to identify the states of the input signal as merely a positive and a negative value of a signal whose particular value does not matter. In these circumstances a comparator need merely be able to produce an output signal if the polarities of two signals, each representing a state of the input signal and the bistable circuit respectively, do not correspond; various other possibilities can be adopted, it being only necessary that the state of the bistable circuit can be compared with the state of the input signal so that a comparison device can check whether there is correspondence between the two states.

It should also here be remarked that "output," as far as the comparator is concerned, represents merely a change in the value of some signal from a value which is assigned to equality between the states of the input signal and the bistable. The particular value of the output of the comparator does not matter and indeed it is conceivable that no output from the comparator could correspond to some nonzero voltage while "output" from the comparator could correspond to a zero voltage. This is possible if the coding of signals used by an associated computer accords with inverse coded logic. In any event, "output signal" (from the comparator) means the presence of some signal which is produced by the comparator only when there is no correspondence between the states which the comparator compares.

Figure 4A:
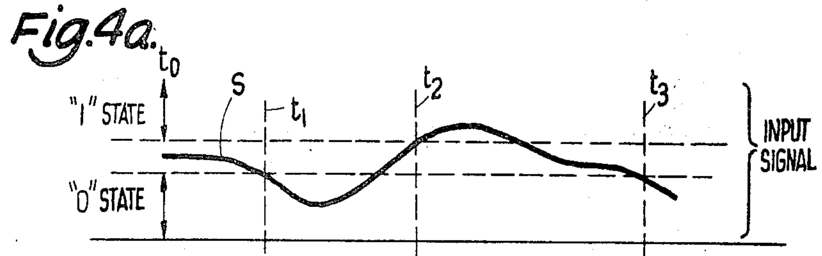
FIGS. 4*a* to 4*e* illustrate waveforms at various points in the embodiments of FIGS. 1 and 2.
Figure 4B:
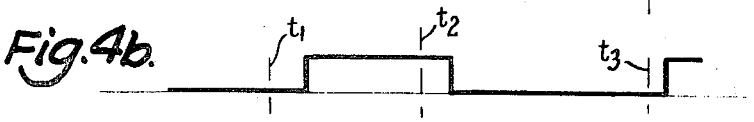
Figure 4C:
Figure 4D:
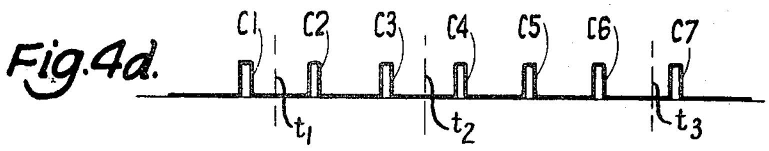
Figure 4E:
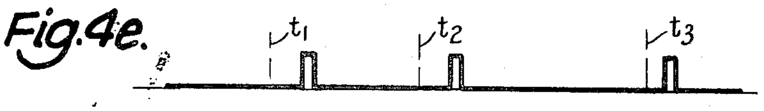

Referring now particularly to FIG. 4*a* at a time $t_0$ the input signal is in the dead band between the "1" state and the "0" state, the comparator output being at zero (FIG. 4*c*). The clock pulses are shown in FIG. 4*d*. At the time of the first clock pulse C1, the signal S has not yet reached the "0" state and no change is detected. At time $t_1$ the input signal enters the "0" state and the comparator output becomes nonzero. This condition persists until the next clock pulse C2; then both inputs to the gate 15 are present and the state (FIG. 4*b*) of the bistable circuit 14 changes to "0"; the comparator output falls to zero. This process is repeated at times $t_2$ (entry into the "1" state) and $t_3$ (reentry into the "0" state).

It will be seen that in each case the termination of the output from the comparator is coincident with the clock pulse next succeeding the change in state. However, the start of the output from the comparator occurs sometime before this, at some point intermediate two clock pulses. This is often undesirable and reference will now be made to FIG. 2 which shows a circuit similar to FIG. 1 save that a further bistable circuit, the memory 18, has been added. The bistable 18 is arranged to produce "1" or "0" outputs depending on the state of the input signal but, like the bistable 14, can change in state in response to the input signal only when a clock pulse is received. With this modification, no change in the input to the comparator 12 can occur until (for example) the beginning of clock pulse C2, whereupon all the switching described previously occurs. The output from the comparator 12 thereby takes the form shown in FIG. 4*e* which consists of short duration pulses, each synchronous with the clock pulse immediately succeeding a change in state of the input signal. The actual termination of the nonzero comparator output will depend on the switching times of the various components used.

It should be remarked that the input signal may be in the form shown by FIG. 4*b*, namely in a form usually recognised as a digital signal.

Figure 2:
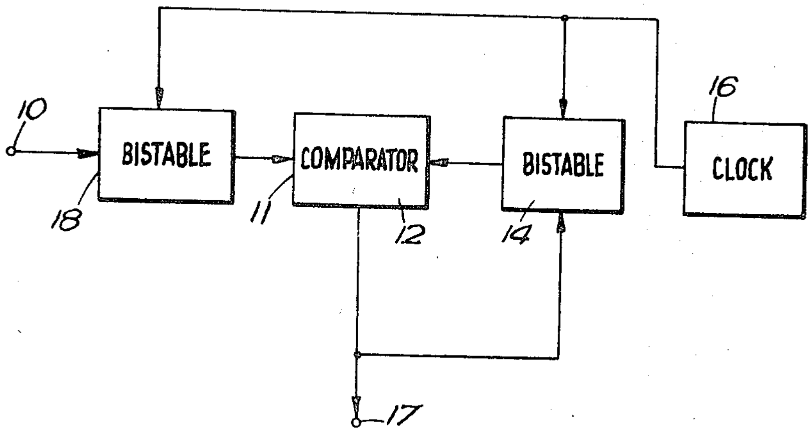
FIG. 2 is a schematic illustration of a more complex embodiment of the invention.

With the arrangement shown in FIGS. 1 and 2 the output from the comparator has been used to change the state of bistable 14. Although the embodiments of the invention shown in FIGS. 1 and 2 may be employed in practice, it is possible to construct a more economical arrangement in which the part corresponding to the comparator 12 need not effect the changes in state of the bistable circuit 14. As has been mentioned, the present invention may be partly embodied by two bistable devices or circuits provided as a two-stage shift register.

Figure 3:
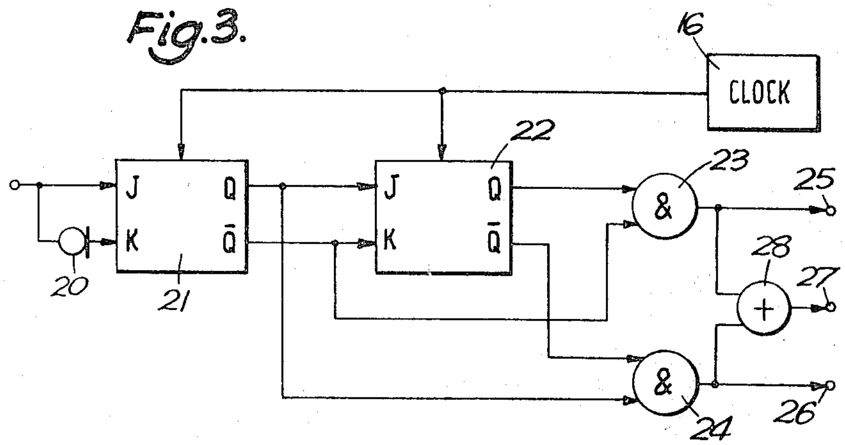
FIG. 3 is a schematic illustration of a practical embodiment of the invention.

A practical embodiment of this form of the invention is shown in FIG. 3, which shows two tandem connected JK bistable circuits 21 and 22 and two AND gates 23 and 24 which are respectively fed by alternate outputs from the JK bistable circuits. This is, the AND gate 23 is fed by the direct (Q) and inverse ($\overline{Q}$) outputs of the bistable circuits 22 and 21 respectively and the AND gate 24 is fed by the direct (Q) and inverse ($\overline{Q}$) outputs of the circuits 21 and 22 respectively.

The JK bistable circuit 22 in this embodiment constitutes the said first bistable device.

It is useful to note that a JK bistable circuit is changed between states by the application of (0,1) and (1,0) signals to its J and K input respectively, changed in state (whatever its state) when the input signals are (1,1) and remains in its original state when the input signals are (0,0).

With the system shown in FIG. 3 a digital signal which may be representative of the state of the input signal or may be regarded as the input signal itself is fed to the J input of the bistable circuit 21 and through an inverting circuit 20 to the K input of the bistable circuit 22. Again let it be assumed that the signal at the J input terminal is at "0" so that the inputs to the J input and K input of the first bistable circuit 21 are at "0" and "1" respectively. Accordingly, the outputs from the first bistable will be at "0" and "1" respectivey as will the outputs from the second bistable. Since the two AND gates detect different signals there will be no output from either AND gate. As in the preceding figures, the bistables are prevented from changing state unless a clock pulse is present at their gate inputs. When the input signal changes state to a "1" the first bistable circuit 21 will be changed in state and its outputs will be "1" and "0" respectively when the next succeeding clock pulse from the clock 16 is received. Momentarily the AND gate 24 will have two "1's" at its input and will produce an output which is fed to a terminal 26. The two inputs to the AND gate 23 will now be zero and no output will be produced. However, fast switching occurs and the second JK bistable circuit 22 will be changed to the same condition as the first; the output of the AND gate 24 will then fall to zero. When the input level falls again to "0" the AND gate 24 will be energised momentarily to produce an output at the terminal 25 until the switching changes the second bistable to the same state as the first. With this system it will be seen that although the change in state of the second bistable is effected by virtue of its being a JK bistable circuit and not directly by the output of any comparator the arrangement ensures that it is changed in state only when a clock pulse is contemporary with an output from either AND gate.

With the arrangement of FIG. 3, alternate changes in state of the input signal are denoted by output signals from the respective AND gate. These may be combined and fed to a common output terminal 27 by an OR gate 28.

With the embodiment of FIG. 3, the "first bistable device" of the differentiator is constituted by the second JK bistable circuit; the comparator (the AND gates) responds to the state of the input signal (as denoted by the condition of the other JK bistable circuit) to produce a (momentary) output as the information corresponding to the input signal is shifted from one bistable circuit to the other.

It will be seen that the JK bistable circuits of FIG. 3 form a two-stage shift register. The bistable circuits could be replaced by other bistable arrangements constituting a like shift register.

In the embodiment of FIG. 3, as in that shown in FIG. 2, the bistable circuits are themselves constructed (in any convenient known manner) so as to be inhibited from changing state except on receipt of a clock pulse: that is to say, the "means for inhibiting" are provided by the construction of the bistable circuits.

It would be normal practice to ensure that the clock pulse frequency were at least twice as high as the frequency at which the input signal varies between states.

I claim:

1. A digital differentiator comprising:
   an input means;
   a comparator having a first input coupled to said input means and having a second input and an output;
   a bistable device having a control input and an output which is coupled to said second input of said comparator;
   a source of clock pulses; and
   AND gate means controlling said control input, the AND gate means being coupled to said output of said comparator and to said source.

2. A differentiator for a digital input signal, comprising in combination:
   first and second JK bistable circuits, each having a J input, a K input, a direct output, an inverse output and a synchronising input, the direct output and the inverse outputs of the first JK bistable circuit being coupled respectively to the J input and the K input of the second JK bistable circuit;
   an input terminal coupled to the J input and K input of the first bistable circuit;
   first AND gate means having first and second inputs and an output, the first and second inputs of the first AND gate means being coupled respectively to the direct output of the said first JK bistable circuit and the inverse output of the said second bistable circuit;
   second AND gate means having first and second inputs and an output, the first and second inputs of the second AND gate means being coupled respectively to the direct output of the said second JK bistable circuit and the inverse output of the said first bistable circuit;
   OR gate means having a first input coupled to the output of said first AND gate means and a second input coupled to the output of said second AND gate means; and
   a source of clock pulses coupled to the synchronising inputs of said first and second JK bistable circuits.

References Cited

UNITED STATES PATENTS 3,471,790 10/1969 Kaps ------------ 328—164 XR

DONALD D. FORRER, Primary Examiner

J. ZAZWORSKY, Assistant Examiner

U.S. Cl. X.R.

307—221, 235, 268; 328—127, 206